United States Patent
Kreiling

(10) Patent No.: US 7,434,864 B2
(45) Date of Patent: Oct. 14, 2008

(54) CABRIOLET VEHICLE

(75) Inventor: Nils Kreiling, Osnabrück (DE)

(73) Assignee: Wilhelm Karman GmbH, Osnabrueck (DE)

( * ) Notice: Subject to any disclaimer, the term of this patent is extended or adjusted under 35 U.S.C. 154(b) by 60 days.

(21) Appl. No.: 10/597,098

(22) PCT Filed: Jan. 15, 2005

(86) PCT No.: PCT/DE2005/000053

§ 371 (c)(1),
(2), (4) Date: Oct. 13, 2006

(87) PCT Pub. No.: WO2005/068237

PCT Pub. Date: Jul. 28, 2005

(65) Prior Publication Data

US 2007/0158971 A1  Jul. 12, 2007

(30) Foreign Application Priority Data

Jan. 20, 2004  (DE) .................. 10 2004 003 020

(51) Int. Cl.
*B60J 7/20* (2006.01)
*B60J 7/12* (2006.01)
(52) U.S. Cl. ............... 296/107.04; 296/107.15
(58) Field of Classification Search ............ 296/107.01, 296/107.04, 107.05, 107.07, 107.08, 107.15, 296/108, 213
See application file for complete search history.

(56) References Cited

U.S. PATENT DOCUMENTS

| 3,096,117 | A | * | 7/1963 | Hallenbeck | ............ 296/107.07 |
|---|---|---|---|---|---|
| 3,536,354 | A | * | 10/1970 | Ingram | ................ 296/147 |
| 3,630,568 | A | * | 12/1971 | Podwys | ............... 296/116 |
| 4,572,570 | A | * | 2/1986 | Trucco | ................ 296/107.07 |
| 4,708,389 | A | * | 11/1987 | Maebayashi et al. | ... 296/107.12 |
| 4,723,696 | A | * | 2/1988 | Stichweh et al. | ............ 224/331 |
| 5,533,777 | A | * | 7/1996 | Kleemann et al. | ........... 296/117 |
| 5,743,587 | A | * | 4/1998 | Alexander et al. | .......... 296/108 |
| 5,810,422 | A | * | 9/1998 | Corder et al. | ................ 296/108 |
| 5,975,619 | A | * | 11/1999 | Dettling et al. | ........ 296/107.08 |
| 5,998,948 | A | * | 12/1999 | Lange et al. | ................ 318/280 |
| 6,030,023 | A | * | 2/2000 | Guillez | ................... 296/136.06 |
| 6,039,382 | A | * | 3/2000 | Mather et al. | .......... 296/107.01 |

(Continued)

FOREIGN PATENT DOCUMENTS

DE       3416286 A  * 10/1984  ................. 296/108

(Continued)

*Primary Examiner*—D. Glenn Dayoan
*Assistant Examiner*—Paul A Chenevert
(74) *Attorney, Agent, or Firm*—Quinn Law Group, PLLC; Christopher W. Quinn

(57) ABSTRACT

A cabriolet vehicle with a roof provided which at least in some areas has a flexible cover, which includes in its front roof area a rigid area, a so-called roof top, overlapped by a cover. The front roof area can be stored in the same orientation as in the closed state in a body recess, and the body recess is bounded on the rear by an edge serving as a front edge of the additional body outer surface extending to the rear. The edge is preceded at least in parts of it area by a support step for a flexible lining running from the edge to an area of the roof. The step is adapted to the contour of the edge.

11 Claims, 14 Drawing Sheets

U.S. PATENT DOCUMENTS

| | | | | |
|---|---|---|---|---|
| 6,145,909 A * | 11/2000 | Staley et al. | | 296/39.1 |
| 6,145,915 A * | 11/2000 | Queveau et al. | | 296/107.08 |
| 6,270,143 B1 * | 8/2001 | Heselhaus et al. | | 296/107.01 |
| 6,305,734 B1 * | 10/2001 | Pecho et al. | | 296/107.01 |
| 6,364,396 B1 * | 4/2002 | Hayashi et al. | | 296/136.06 |
| 6,485,085 B1 * | 11/2002 | Pecho et al. | | 296/107.07 |
| 6,578,898 B2 * | 6/2003 | Rothe et al. | | 296/107.07 |
| 6,604,774 B2 * | 8/2003 | Koch et al. | | 296/107.08 |
| 6,641,202 B2 * | 11/2003 | Graf et al. | | 296/107.04 |
| 6,663,163 B2 * | 12/2003 | Koch | | 296/107.08 |
| 6,695,384 B2 * | 2/2004 | Obendiek et al. | | 296/107.09 |
| 6,722,723 B2 * | 4/2004 | Obendiek | | 296/107.08 |
| 6,789,836 B2 * | 9/2004 | Willard | | 296/107.07 |
| 6,832,804 B2 * | 12/2004 | Eichholz et al. | | 296/107.08 |
| 6,886,880 B2 * | 5/2005 | Heselhaus | | 296/107.07 |
| 6,971,705 B2 * | 12/2005 | Nania | | 296/118 |
| 7,014,246 B2 * | 3/2006 | Huedepohl | | 296/107.07 |
| 7,121,602 B2 * | 10/2006 | Queveau et al. | | 296/24.44 |
| 7,125,065 B2 * | 10/2006 | Haberl et al. | | 296/107.08 |
| 2001/0017475 A1 * | 8/2001 | Busch | | 296/107.01 |
| 2003/0020297 A1 * | 1/2003 | Koch | | 296/107.08 |
| 2004/0084929 A1 * | 5/2004 | Neubrand | | 296/107.15 |
| 2006/0186693 A1 * | 8/2006 | Taira et al. | | 296/107.04 |

FOREIGN PATENT DOCUMENTS

| | | | | |
|---|---|---|---|---|
| DE | 3635373 A1 * | 4/1988 | | 296/108 |
| DE | 19801876 A * | 7/1999 | | 296/108 |
| JP | 02306822 A * | 12/1990 | | 296/108 |

* cited by examiner

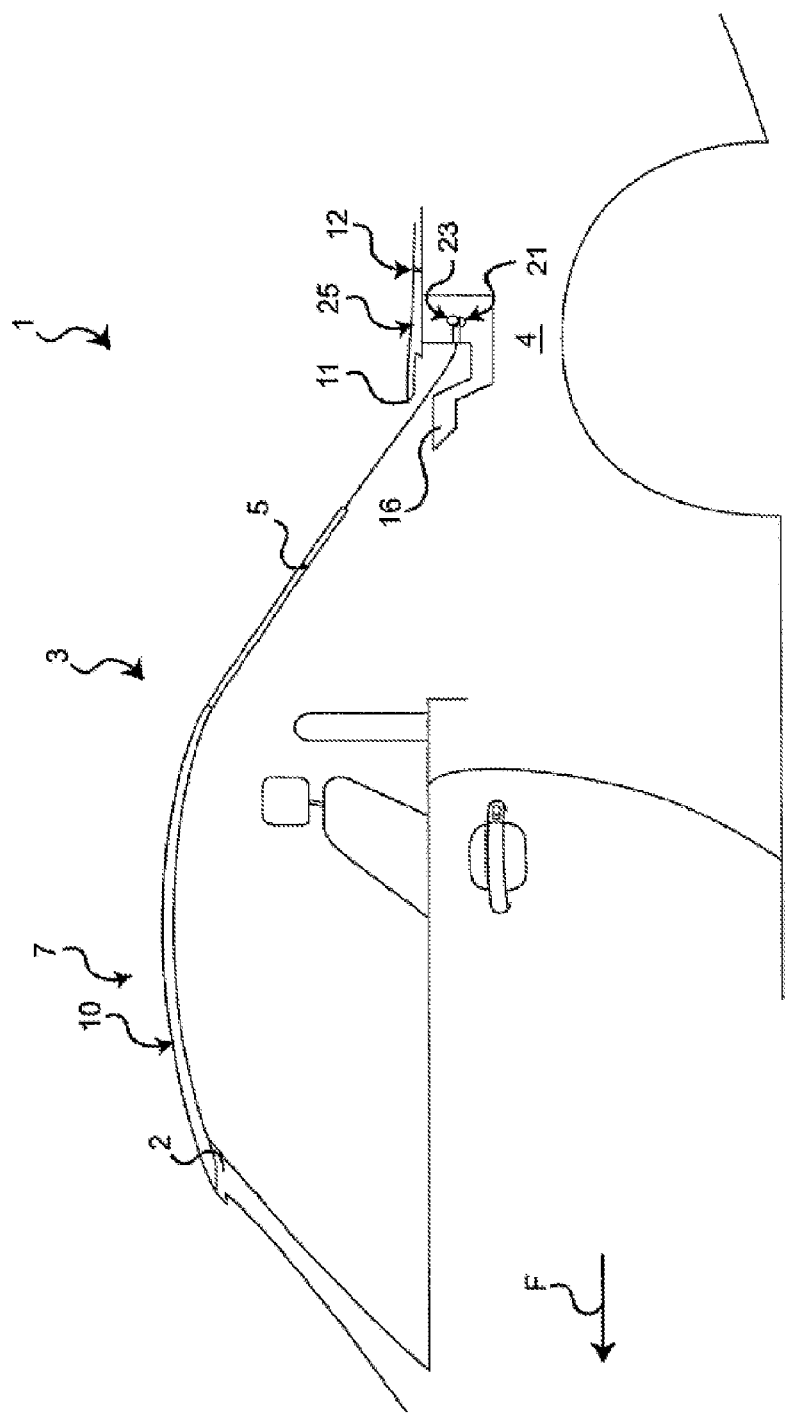

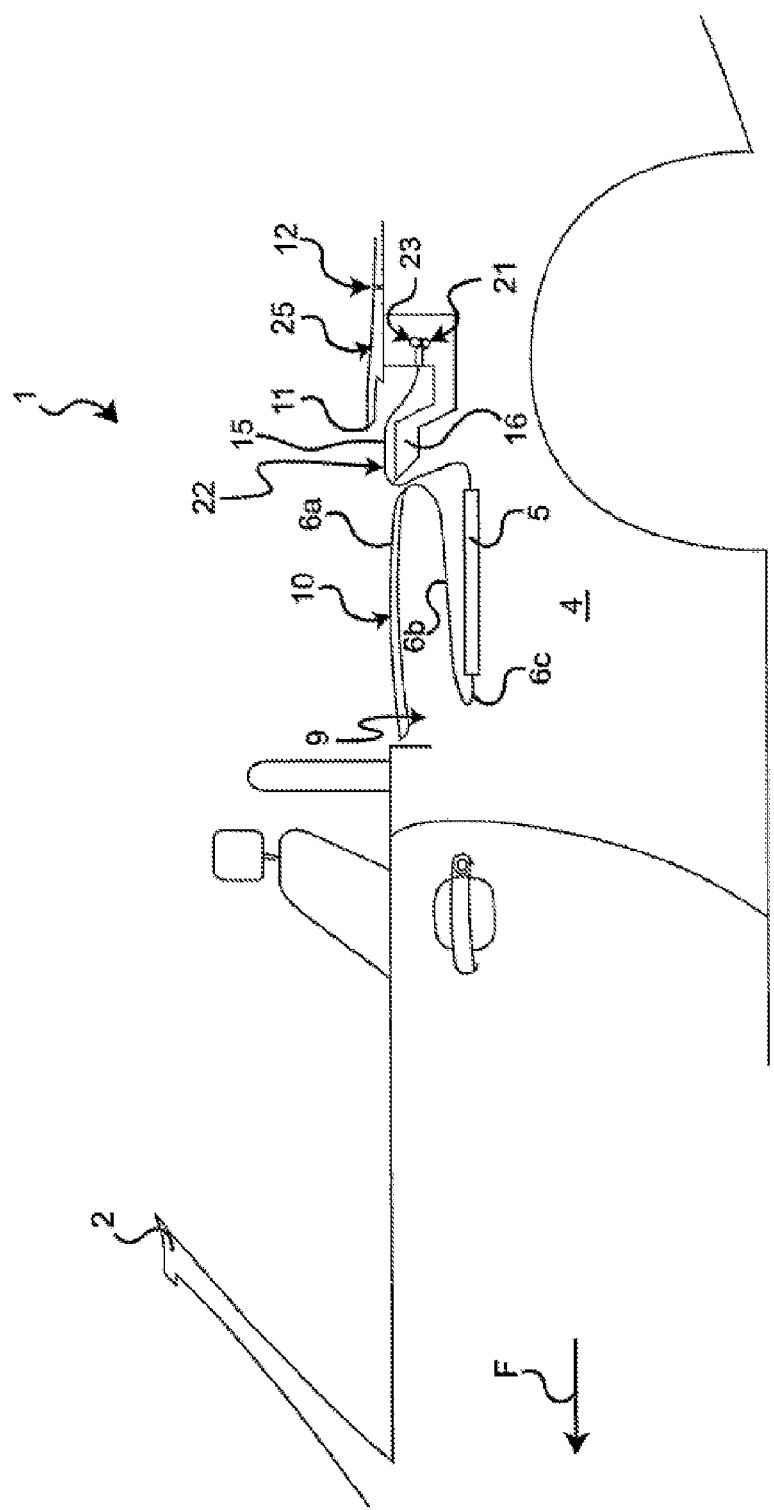

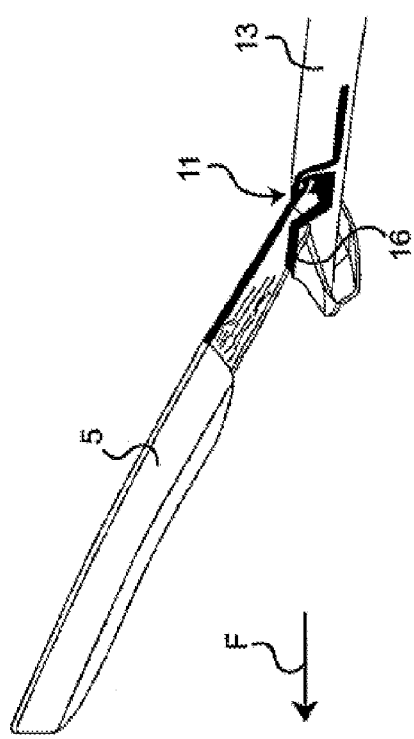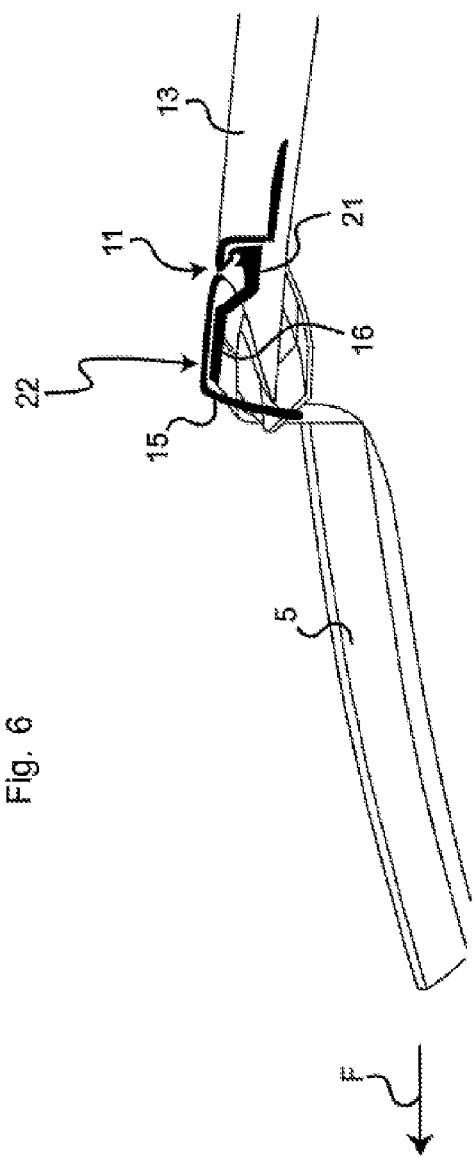

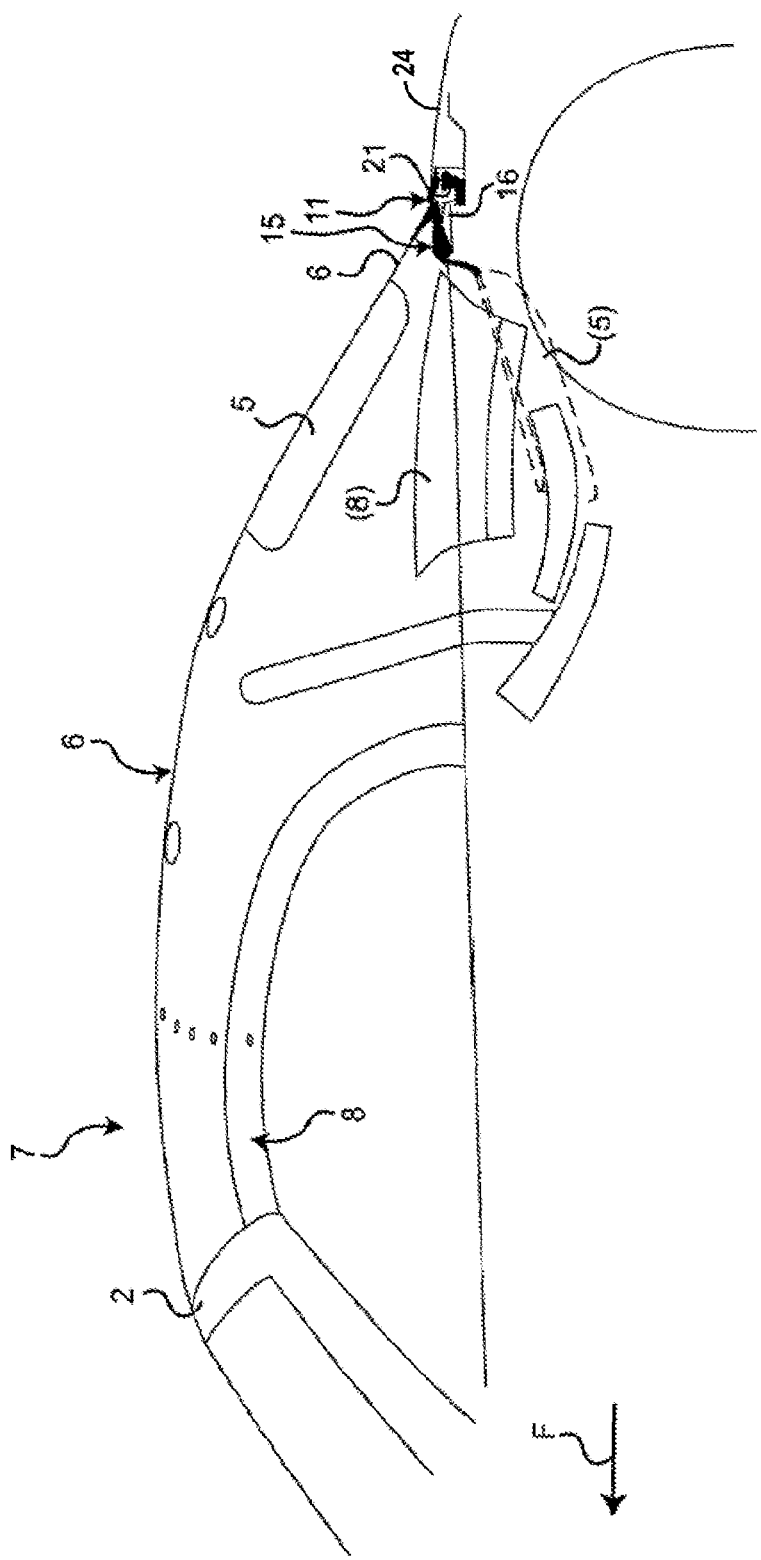

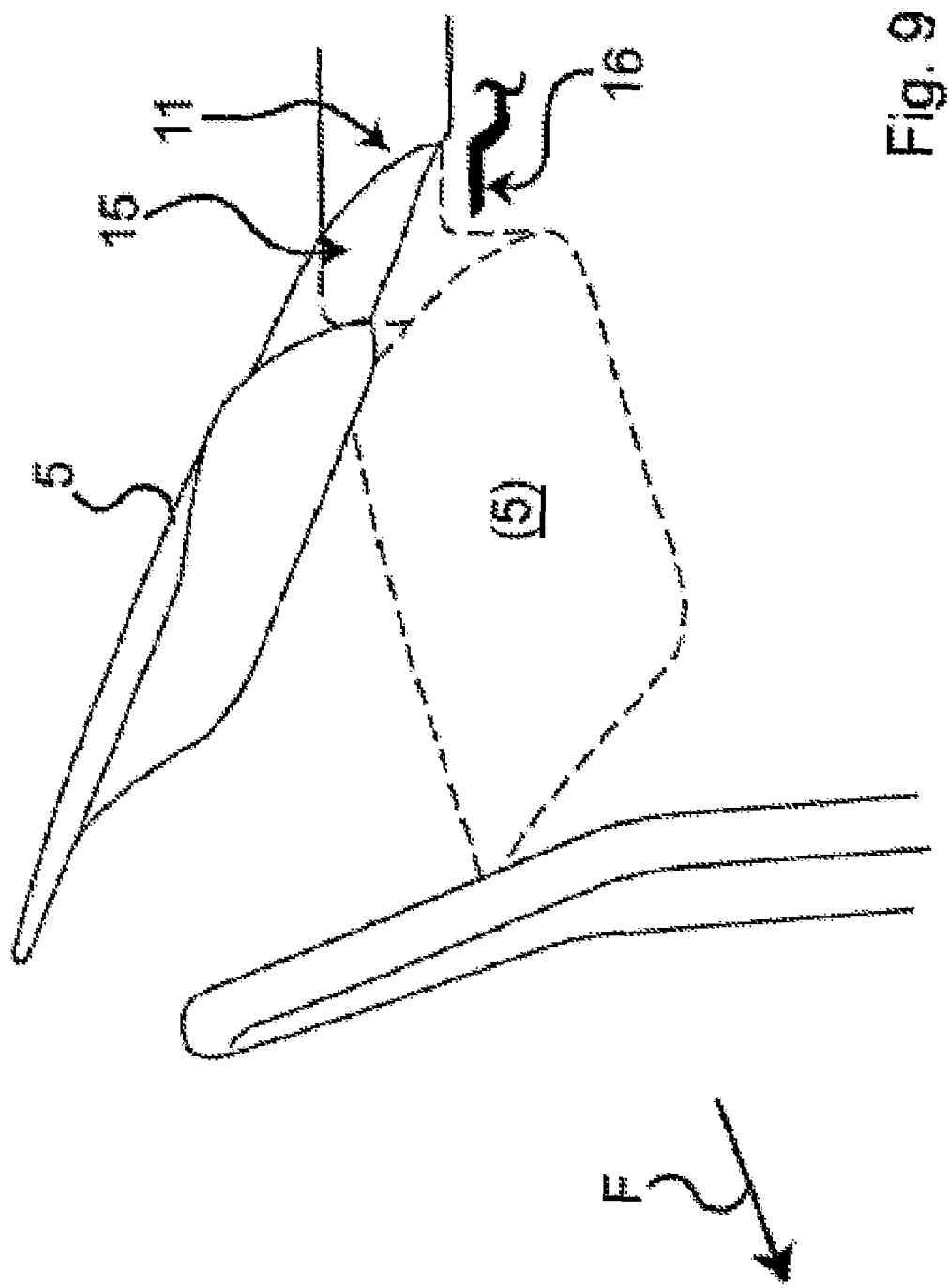

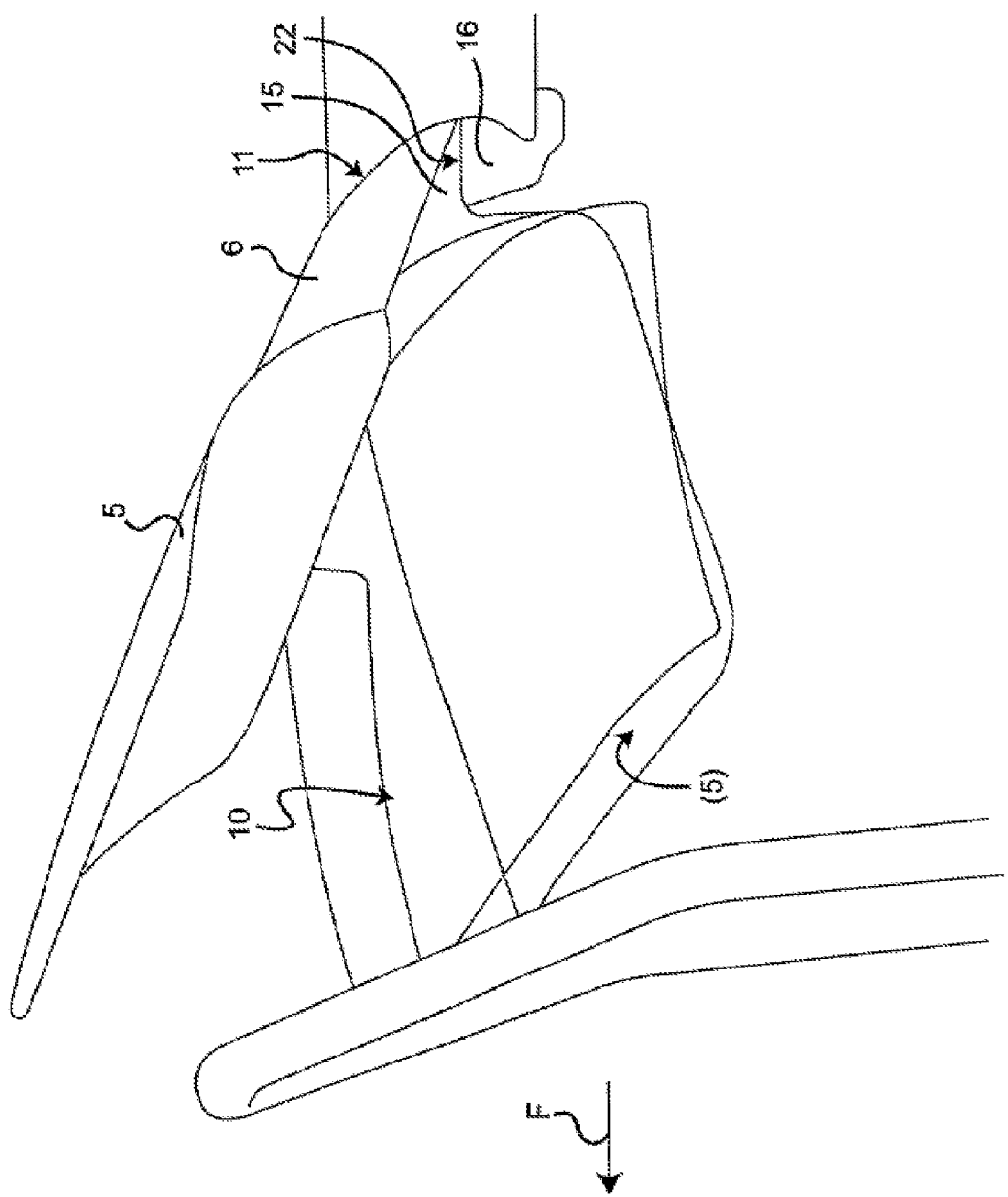

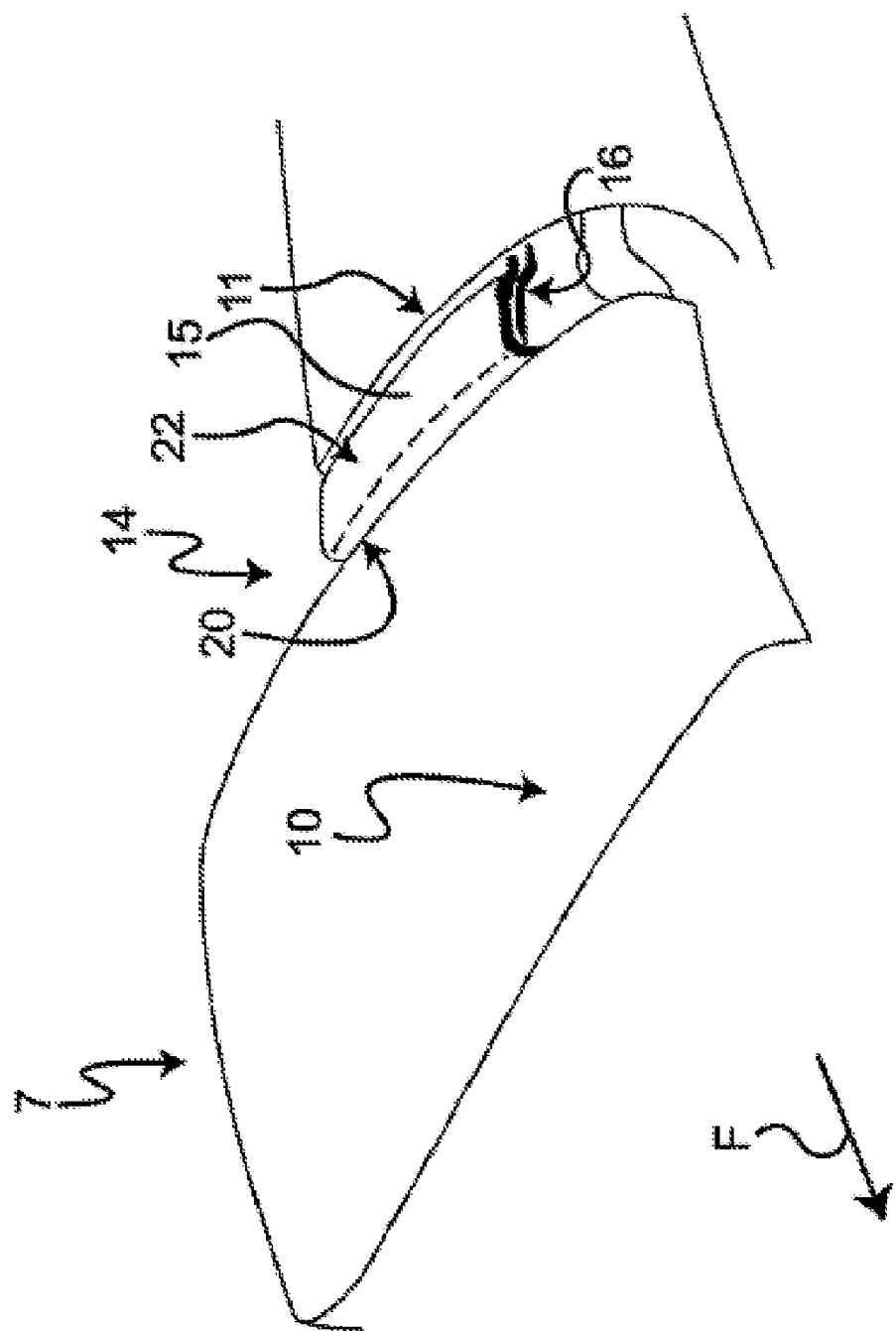

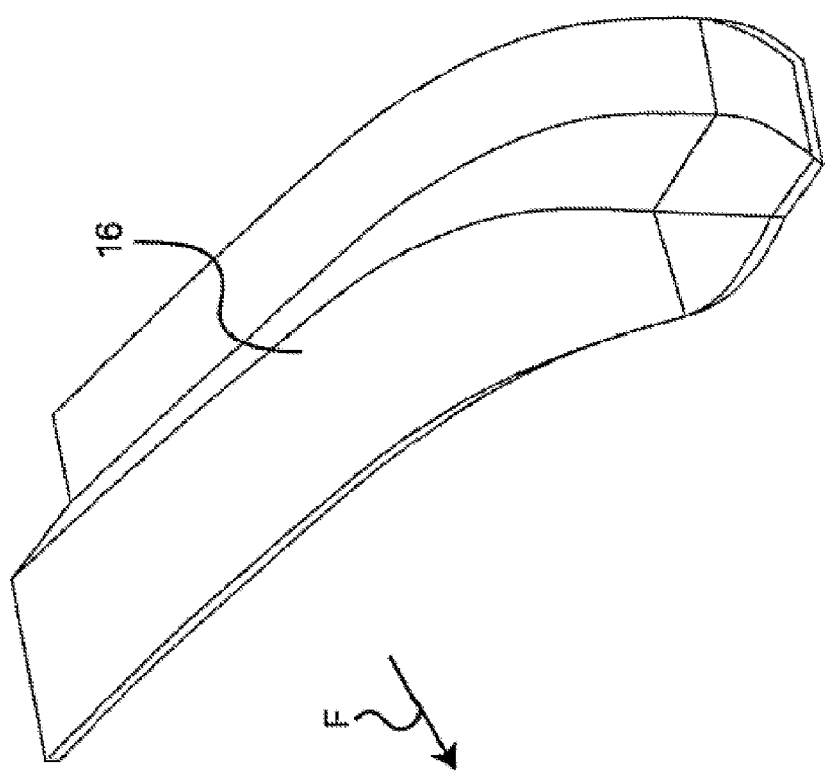

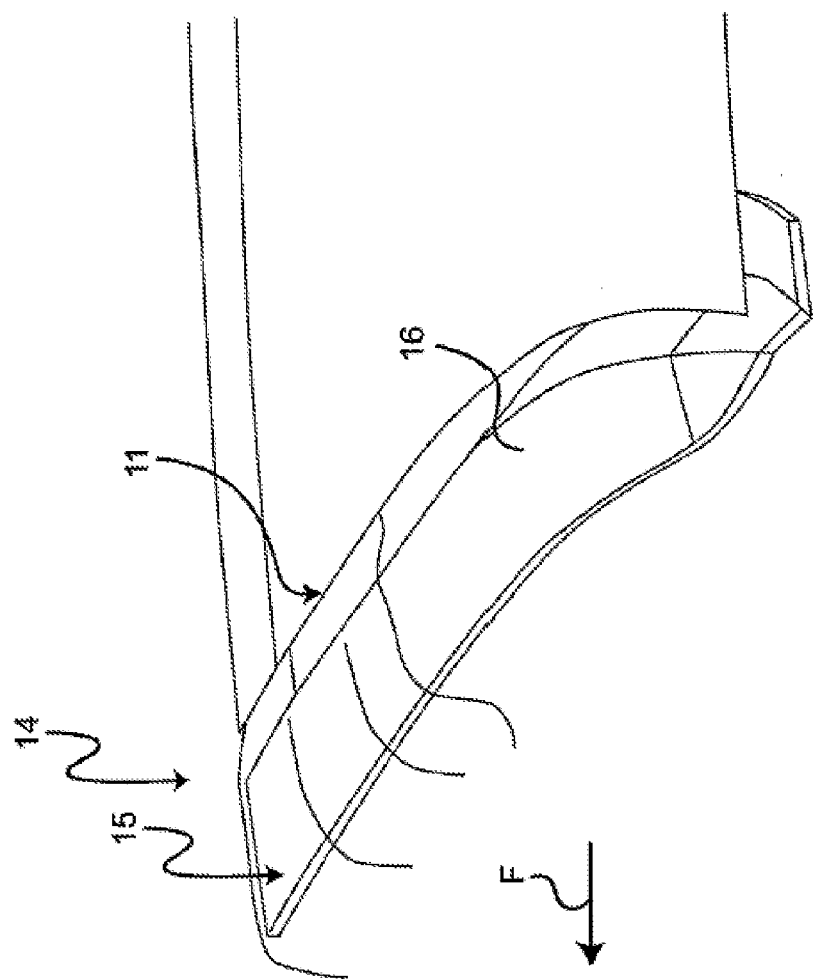

CABRIOLET VEHICLE

CROSS-REFERENCE TO RELATED APPLICATION(S)

This application is a US National Phase of International Application No. PCT/DE 2005/000053, filed Jan. 15, 2005, which claims priority to German 10 2004 003 020.0, filed Jan. 20, 2004. The entire contents of the above identified applications are incorporated herein by reference.

TECHNICAL FIELD

The invention relates to a cabriolet vehicle with a roof, which at least in some areas has a flexible cover.

BACKGROUND OF THE INVENTION

It is known that the front roof area in a cabriolet vehicle of the mentioned type, when the roof is opened, lies with its rigid roof top over other areas of the roof in the fashion of a cover and remains openly visible from the top. The roof then lies in an auto body recess made in the outside surface of the auto body. It encloses the recess at least on the sides and rear. In the front it is indirectly or often directly connected to a passenger compartment.

In this case, on the one hand the rear limitation of the recess, which represents a front edge of the body outside surface connected farther to the rear is designed in a curved shape, which runs forward to the vehicle sides, for a harmonic transition of the edges bordering the recess. Functionally this is also desirable for the largest possible access opening beneath a trunk lid adjacent to the rear, which is supposed to lie with its front limitation edge (in the direction of travel) parallel to the front edge that borders the recess.

On the other hand, a roof of the mentioned type, when opened, is supposed to fold in behind the rigidly held from below front roof area so that the folding edge there, if possible, runs at least almost linearly in a 90° angle relative to the direction of travel over the roof width in a top view in order to ensure a clean cover trend when the roof is closed without additional areas of loose fabric or folds.

Consequently, a conflict arises on the rear edge of the limitation of the recess at least in the side corner areas between the linear rear edge of the front roof part which then lies on the top, and the limitation edge of the recess which points forward on the transverse sides. If the corners of the front roof part during roof movement are supposed to be passed by the edge without collision, a significant spacing between the parts is therefore essential. Consequently, an elongated gap between the edge of the recess and the folding edge of the front roof part positioned to the rear remains at least in the area of the vertical vehicle longitudinal center plane in the vehicle longitudinal direction. Such gaps, however, are aesthetically undesirable and without additional measures also make possible unauthorized access into the trunk situated beneath it.

An attempt to mitigate this conflict consists of providing for the rear end area of the recess a narrow moving hinged cover almost crescent-shaped in top view whose rear edge lies essentially across the vehicle and whose front edge lies in the desired curvature with the forward facing areas. This moving cover, however, requires additional drive and control expense and with its additional side joints interferes with the appearance of the outer surface of the auto body.

SUMMARY OF THE INVENTION

The underlying problem solved by the invention is to optimize storage of a roof with the front roof part lying in the same orientation in the stored position as in the closed position.

According to the invention, the gap is reduced by the support step that is covered by a flexible lining. Moving cover parts of any type are therefore unnecessary. An improvement is therefore achieved both aesthetically and as security against break-in.

The production and part expense is therefore particularly low if the support step is designed as a one-piece molded part.

Another design, according to which the lining is formed as a textile curtain, which is secured over a large part of the width of the recess and on the rear end of the moving roof, ensures reliable and flexibly movable gap reduction. In particular, a combination can be advantageous, according to which the curtain overlaps the support step when the roof is open so that its tension can be ensured at any time.

The part expense is further reduced when the molded part also includes a fastening device for the lining behind the support step so that no separate parts are required for this either, but, for example, pulling of a piping into the fastening device can very simply effect the fastening of the lining.

The lining can advantageously cover visually from above almost completely the gap between the edge and the opened roof.

Additional advantages and features of the invention are apparent from a practical example of the object of the invention schematically shown in the drawing and described below.

BRIEF DESCRIPTION OF THE DRAWINGS

In the drawings:

FIG. 4 shows a schematized side view truncated in the lower portion in the area of the vertical longitudinal center plane of the vehicle according to the invention with the roof closed and locked, FIG. 5 shows a view similar to that of FIG. 4 with a fully opened roof, FIG. 6 shows a detail section of the rear roof connection in the position according to FIG. 4, FIG. 7 shows a view similar to that of FIG. 6 with the opened roof according to FIG. 5, FIG. 8 shows a schematized side view truncated in the lower area in the closed and opened roof position according to FIGS. 4 and 5, FIG. 9 shows a schematized perspective view of the rear window and its connection in the closed and opened roof, FIG. 10 shows a view similar to that of FIG. 9, but with a front roof area additionally shown in the open roof position, FIG. 11 shows a schematized perspective view of the opened roof oblique from the top, FIG. 14 shows a perspective detail view of the support step, FIG. 15 shows the part according to FIG. 14 in the position mounted on the vehicle.

DESCRIPTION OF THE PREFERRED EMBODIMENTS

Figure 1:
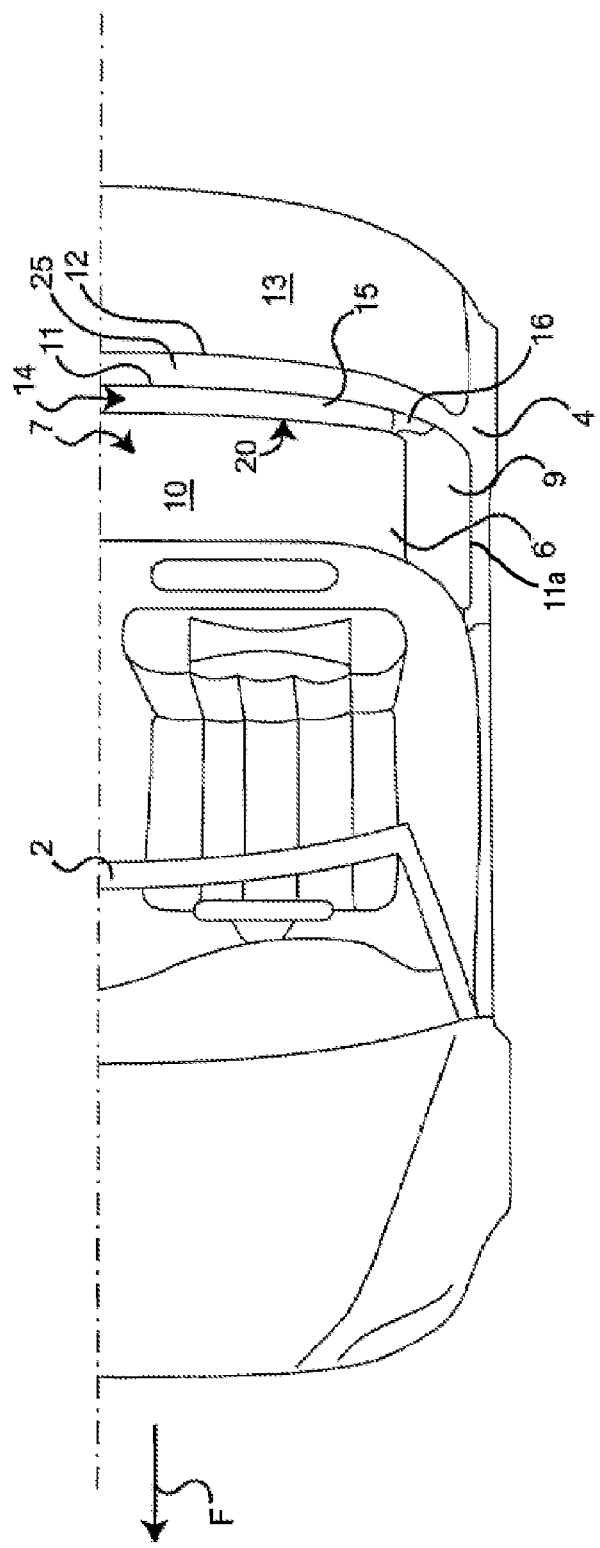
FIG. 1 shows a vehicle according to the invention in a schematic view truncated on the vertical longitudinal center plane from the top with the roof opened.

A two-seat vehicle 1 is shown in the drawing figures. The invention is also applicable, for example, to a four- or multi-seat cabriolet vehicle provided with a rear seat.

The vehicle 1 comprises in its upper area and an area indirectly or directly adjacent to a windshield frame 2 a roof 3 movable relative to auto body 4, which can include a flexible roof cover 6 outside a rear window 5.

Figure 2:
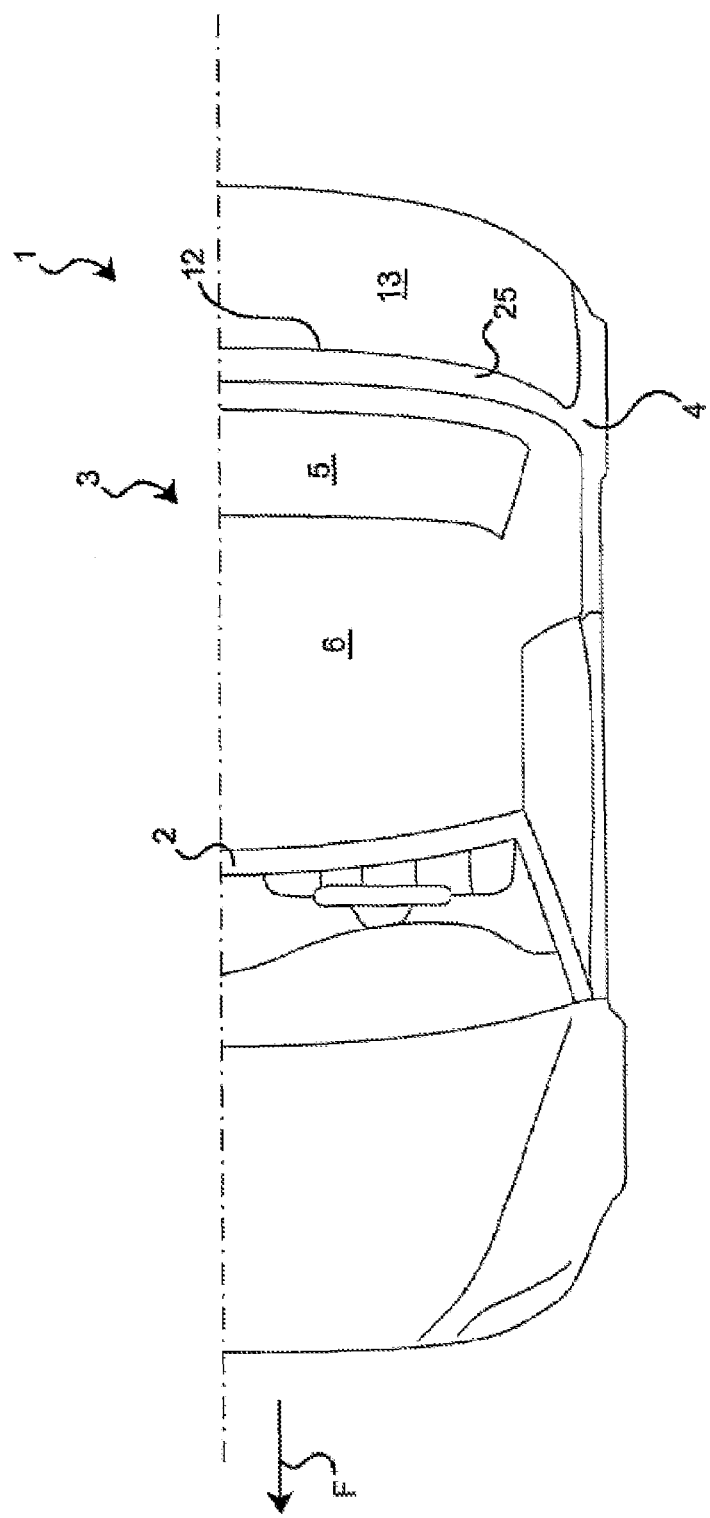
FIG. 2 shows a view similar to that of FIG. 1 but with the roof closed.

In direction of travel F the roof 3 contains a front roof area 7, which includes a rigid end area 8 overlapped at least in areas by a cover 6, so-called roof top, for its fastening on windshield frame 2. The front roof area 7 during opening of the roof (transition from FIG. 2 to FIG. 1) can be stored in a body recess 9 in the same orientation as in the closed state, i.e., the surface 10 of the front roof area 7 pointing upward and outward with the roof 3 in the closed position, and the surface 10 also points upward in the open state of roof 3. Roof 3 can be stored for this purpose in a so-called Z-fold, in which the cover 6, is stored Z-shaped with an upper section 6a stored above roof top 8, and a lower section 6c stored around the rear window 5 then lying lowermost and an intermediate section 6b connecting them diagonally (FIG. 5).

The body recess 9 that serves to accommodate the opened roof 3 is bounded at least on the back and partly on the sides by an edge 11 of the body. This edge 11 is curved overall so that its side sections 1a include a component that points in the direction of travel F. It therefore lies parallel to a front closure edge 12 of a trunk lid 13 and offset from it by a stabilizing cross bar 25 (FIG. 1) or can be formed by said edge itself (FIG. 6, FIG. 7).

Figure 3:
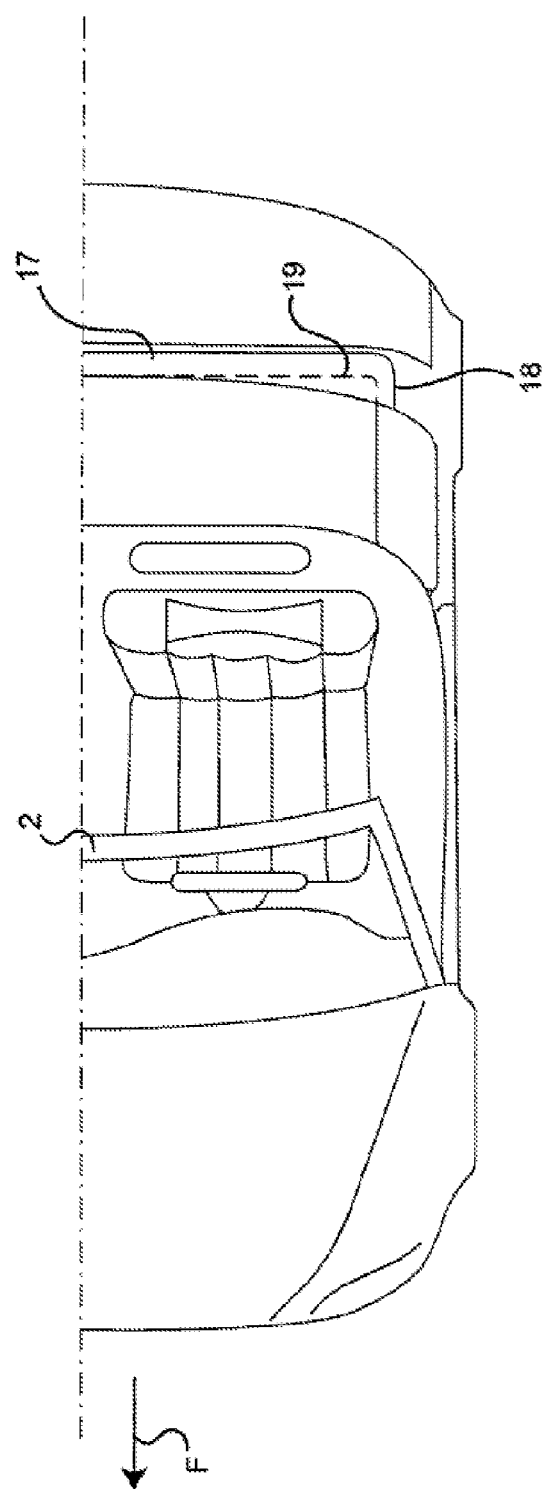
FIG. 3 shows a vehicle according to the prior art in a view similar to that of FIG. 1.
Figure 12:
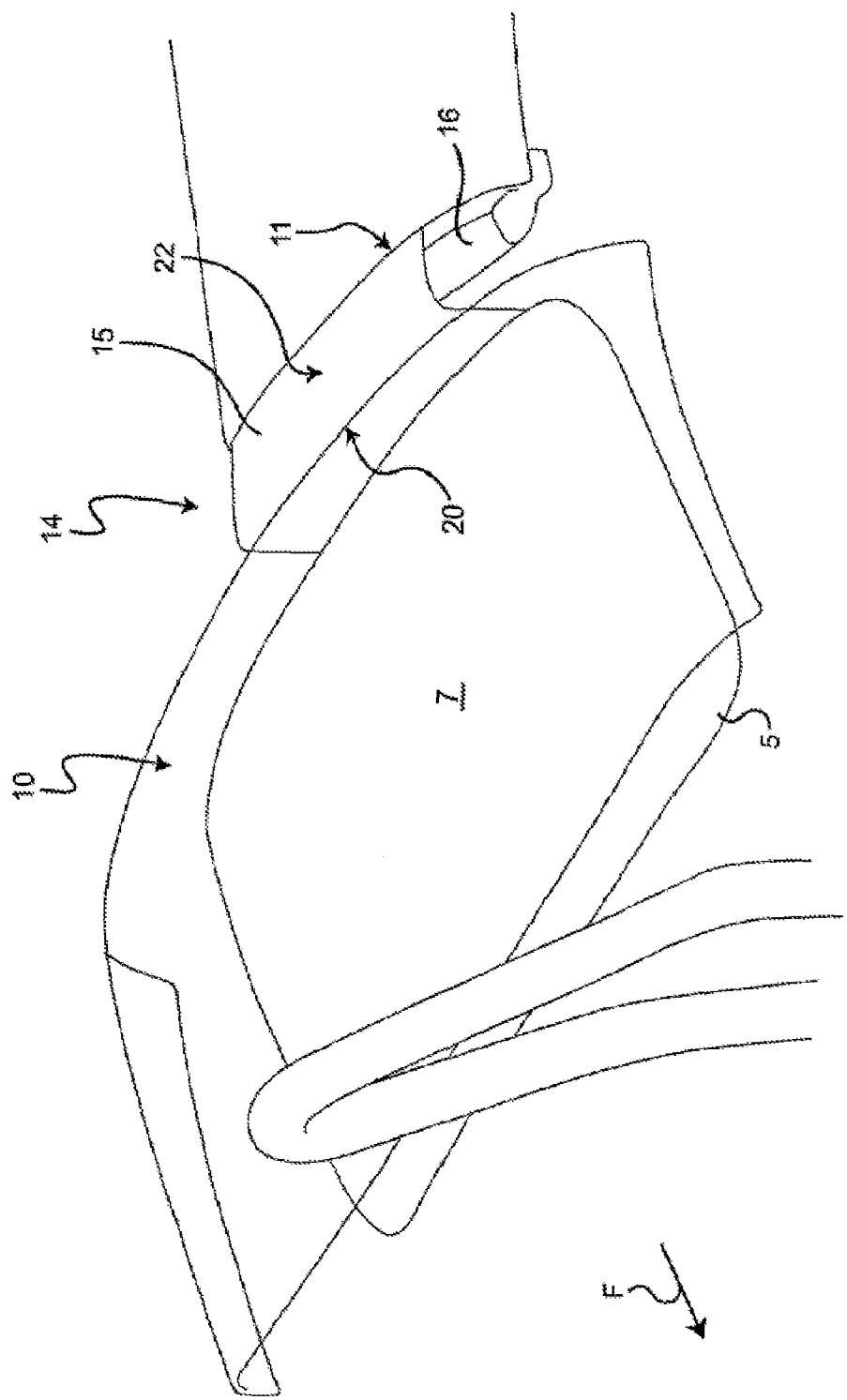
FIG. 12 shows a view similar to that of FIG. 11, but with the rear roof area lying below it additionally shown.
Figure 13:
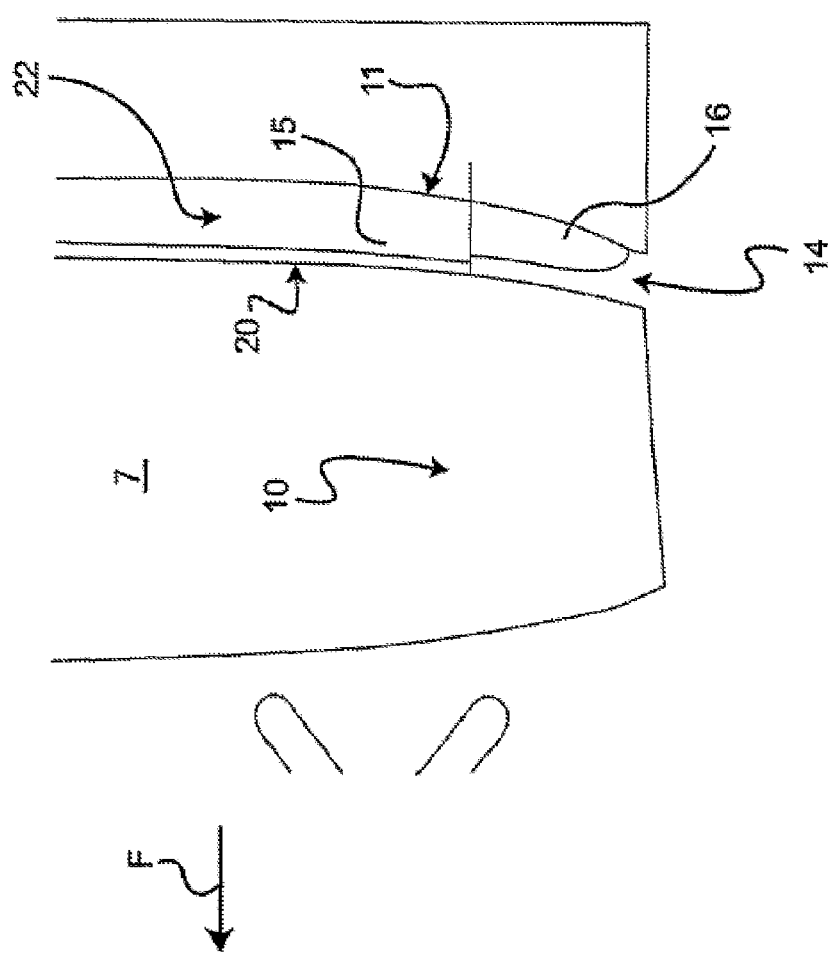
FIG. 13 shows a top view of the opened roof.

If one intends to open such a roof 3 and store it in recess 9, the limitation edge 11 of body 4 must be displaced very far rearward or, as shown in FIG. 3, an additional hinged cover 17 must be provided, which can open for passage of roof 3 and therefore avoid collision of the corner area 19, shown with a dashed line, with the auto body 4. However, this requires the described additional control expense and the visually disadvantageous additional joints 18.

Consequently, according to the invention, a lining 15 is provided, which overlaps partially a support step 16 arranged in direction of travel F in front of edge 11 instead of cover 17 for lining of a remaining gap 14 between the front roof part 7 and edge 11. This support step 16 in the practical example is formed as a one-piece molded part from plastic, magnesium die casting or light metal foam. The design, however, can also be in many different forms. The support step 16 can also be formed from the flexible, rubber-elastic material in order to also permit pressure contact of the front roof area 7 with its rear edge 20 and pressing of lining 15 connected with it. In addition, the support step 16 can also be displaceable in order to permit a larger passage opening for roof 3 in the rearward displaced position and to largely span gap 14 in the forward displaced position.

In the practical example the support step 16 runs parallel to edge 11 and is therefore also curved to the vehicle transverse sides in the travel direction F. It can also lie parallel to the rear edge 20 of the front roof area 7 and then be essentially linear.

In each case, the lining 15 supported by step 16 covers in its essential parts the gap 14 between the rear edge 20 of the stored front roof area 7, and the edge 11 of the body 4 that bounds the recess on the back. The lining 15 is formed here as a textile curtain and by an area of the roof cover 6 lying beneath the rear window 5 when the roof is closed (FIG. 4, FIG. 9). No additional components or assembly steps are therefore required for lining 15 itself.

The textile curtain 15 with the roof opened (FIG. 5) lies so that it initially runs upward from its connection 21 beneath edge 11 and forms a horizontal surface 22, before it drops downward to the rear window 5 lying below in the storage position. For this purpose it can extend in particular over the already described support step 16, which then engages the curtain 15 from below, beneath its horizontal surface 22, and supports it. The surface 22 lies at roughly the same height as the outer surface 10 of the front roof part 7 and the additional outer surface 24 of body 4 lying behind edge 11.

The connection 21 can be integrally formed in particular by a fastening device 23 in the molded part that forms the support step 16, for example, by an engagement channel for a piping. The one-piece molded part can then include both the support step 16 and the fastening device 23 and therefore be particularly suitable for assembly. Since the connection 21 lies under the edge 11, it need not follow its curvature, but can depending on the conditions run almost linearly in cover 6 over the vehicle width.

The molded part can also form a water channel between the fastening device 23 and the support step 16.

The lining 15 can also be formed by a separate part, for example a folding part, a roller shutter or the like.

The invention is applicable both for manually and semi or fully automatically moved roofs 3.

While the best modes for carrying out the invention have been described in detail, those familiar with the art to which this invention relates will recognize various alternative designs and embodiments for practicing the invention within the scope of the appended claims.

The invention claimed is:

1. Cabriolet vehicle (1) with roof (3) provided which at least in some areas has a flexible cover (6), which includes in a front roof area (7) a rigid area (8), where the front roof area (7) can be stored in the same orientation as in the closed state in a body recess (9), which is bounded on the rear by an edge (11) serving as front edge of an additional body outer surface (24) extending to the rear, characterized by the fact that the edge (11) is preceded by a support step (16) for a flexible lining (15) running from the edge (11) to an area of the roof (3), where said step is adapted to the contour of the edge.

2. Cabriolet vehicle (1) according to claim 1, characterized by the fact that the lining (15) visually covers a gap (14) on the top between the edge (11) of auto body (4) and the opened roof (3).

3. Cabriolet vehicle (1) according to claim 1, characterized by the fact that the edge (11) at least in portions is the front edge of a cross bar (25) of the body outer surface (24) arranged in front of a trunk lid (13).

4. Cabriolet vehicle (1) according to claim 1, characterized by the fact that the support step (16) is designed as a one-piece molded part.

5. Cabriolet vehicle (1) according to claim 4, characterized by the fact that a fastening device (23) for lining (15) is formed by the molded part in an area behind the support step (16).

6. Cabriolet vehicle (1) according to claim 1, characterized by the fact that the edge (11) of auto body (4) overall has a curved shape, which includes areas running forward to the vehicle sides in the direction of travel.

7. Cabriolet vehicle (1) according to claim 6, characterized by the fact that the edge (11) at least in portions is the front edge of a trunk lid (13).

8. A roof (3), movable between an open and a closed position, for uncovering and covering a body recess (9) of a cabriolet vehicle (1), said roof (3) comprising:

a front roof area (7) having an outer surface (10) wherein the front roof area (7) extends to a rear edge (20);

an edge (11) bounding a back of the body recess (9);

the rear edge (20) and the edge (11) defining a gap (14) therebetween;

a support step (16) disposed in front of the edge (11) in a direction of travel (F);

a lining (15) extending between the support step (16) and the rear edge (20) of the front roof area (7) for covering the gap (14) such that the lining forms a horizontal surface (22) when the roof (3) is in the open position;

wherein the horizontal surface (22) of the lining (15) is generally the same height as the outer surface (10) of the front roof area (7) when the roof (3) is in the open position.

9. A roof (3), as set forth in claim 8, wherein the front roof area (7) further includes a flexible cover (6), wherein the flexible cover (6) at least partially overlaps the front roof area (7).

10. A roof, as set forth in claim 9, wherein the flexible cover (6) includes an upper section (6a) and a lower section (6c) and an intermediate section (6b) interconnects the upper section (6a) and the lower section (6c);

wherein the flexible cover (6) is foldable for storage in the open position within the body recess (9) such that the upper section (6a) is stored in a horizontal position above the lower section (6c) and the intermediate section (6b) interconnects the upper section (6a) and the lower section (6c) to form a Z-shape.

11. Cabriolet vehicle (1) with a roof (3) provided which at least in some areas has a flexible cover (6), which includes in a front area (7), a rigid area (8) overlapped by the cover (6), where the front roof area (7) can be stored in a body recess (9) in the same orientation as in the opened state, wherein the body recess (9) is bounded rearward by an edge (11) serving as a front edge of an additional body outside surface (24) of a body (4) extending to the rear, characterized by the fact that a textile curtain (15) extends between the body (4) and the roof (3), wherein the curtain (15) is fastened over almost the entire width of the recess (9), beneath the rear edge (11) of the recess (9), and is held on an area of the roof (3) where, over at least part of an extent, the curtain (15) forms a surface (22) that is essentially horizontal, and is positioned elevated relative to the connection (21) of the curtain (15) to the body (4).

* * * * *